United States Patent [19]

Phillips

[11] Patent Number: 4,660,050
[45] Date of Patent: Apr. 21, 1987

[54] DOPPLER RADAR VELOCITY MEASUREMENT HORN

[75] Inventor: Oliver A. Phillips, Long Beach, Calif.

[73] Assignee: TRW Inc., Cleveland, Ohio

[21] Appl. No.: 482,527

[22] Filed: Apr. 6, 1983

[51] Int. Cl.⁴ .................. H01Q 1/32; H01Q 19/08
[52] U.S. Cl. .................................. 343/753; 343/786
[58] Field of Search ............ 343/7 UM, 8, 9, 713, 343/754, 912, 753, 786

[56] References Cited

U.S. PATENT DOCUMENTS

| | | |
|---|---|---|
| 2,719,230 | 5/1952 | Smoll et al. |
| 3,053,980 | 9/1962 | Schmidt |
| 3,146,449 | 8/1964 | Serge et al. |
| 3,833,906 | 9/1974 | Augustine |
| 3,859,660 | 1/1975 | Augustine et al. |
| 3,895,384 | 7/1975 | Fathauer et al. |
| 4,030,953 | 6/1977 | Rutschow ............... 343/912 |
| 4,045,948 | 9/1977 | Hannibal |
| 4,050,071 | 9/1977 | Clorfeine |
| 4,107,680 | 8/1978 | Kaplan |
| 4,179,699 | 12/1979 | Lunden ............... 343/911 R |
| 4,184,156 | 1/1980 | Petrousky ............... 343/8 |
| 4,288,337 | 9/1981 | Ota et al. ............... 343/911 R |
| 4,318,103 | 3/1982 | Roettele et al. |
| 4,359,734 | 11/1982 | Bachman |
| 4,373,161 | 2/1983 | Matsumura ............... 343/717 |

FOREIGN PATENT DOCUMENTS

2043941 3/1971 Fed. Rep. of Germany.
7332710 8/1973 Fed. Rep. of Germany.

OTHER PUBLICATIONS

"A New Horn Antenna with Suppressed Sidelobes and Equal Beamwidths" by P. D. Potter (The Microwave Journal, Jun., 1963, pp. 71-77).
"Automotive Radar: A Brief Review" by D. M. Grimes and T. O. Jones (Proceedings of IEEE, vol. 62, No. 6, Jun. 1974, pp. 804-822).
"Microwave Lens Design for a Conical Horn Antenna" by L. J. Du and D. J. Scheer (Microwave Journal, Sep. 1976, pp. 49-52).
"A Doppler Radar Velocity Meter for Agricultural Tractors" by S. S. Stuchly et al., (IEEE Transactions on Vehicular Technology, vol. VT-27, No. 1, Feb. 1978, pp. 24-30.
The Microwave Journal, Jun., 1963, Dedham, U.S.A., pp. 71-78.
IEEE Transactions on Vehicular Technology, vol. VT-27, No. 1, Feb., 1978, pp. 24-30.
"Patent Abstracts of Japan", vol. 2, No. 7, Jan., 1978, pp. 10212E77 & JP-A-52-123845.
SAE Technical Paper Series No. 821059, "Radar True Ground Speed Sensor for Agricultural and Off Road Equipment" W. Tsuha et al., Sep. 13-16, 1982.
*Automotive Engineering*, Sep. 1982, Ground Speed Sensed Via Radar", pp. 47-50.
SAE Paper No. 730125 entitled, "Vehicular Radar Speedometer" T. M. Hyltin et al., Jan. 8-12, 1973.

*Primary Examiner*—Eli Lieberman
*Attorney, Agent, or Firm*—Tarolli, Sundheim & Covell

[57] ABSTRACT

Doppler radar apparatus for use in a velocity measuring system for farm tractors and the like. The apparatus includes a dual mode conical horn having a flare angle substantially in excess of 12.5°, and a dielectric lens formed of a glass filled polymer. The doppler output signal provided by the RF transceiver associated with the dual mode horn is high pass filtered to remove low frequency signals therefrom. The horn is mounted in such a way that it is isolated from mechanical vibrations which would induce doppler signal frequencies in excess of the cutoff frequency of the high pass filter. Moreover, the horn assembly (which is aluminum) and a steel housing assembly are coupled together in such a way that thermal expansion and contraction will not loosen the friction fit between the two assemblies. The two assemblies are held together by a single, large diameter annular locking ring.

29 Claims, 6 Drawing Figures

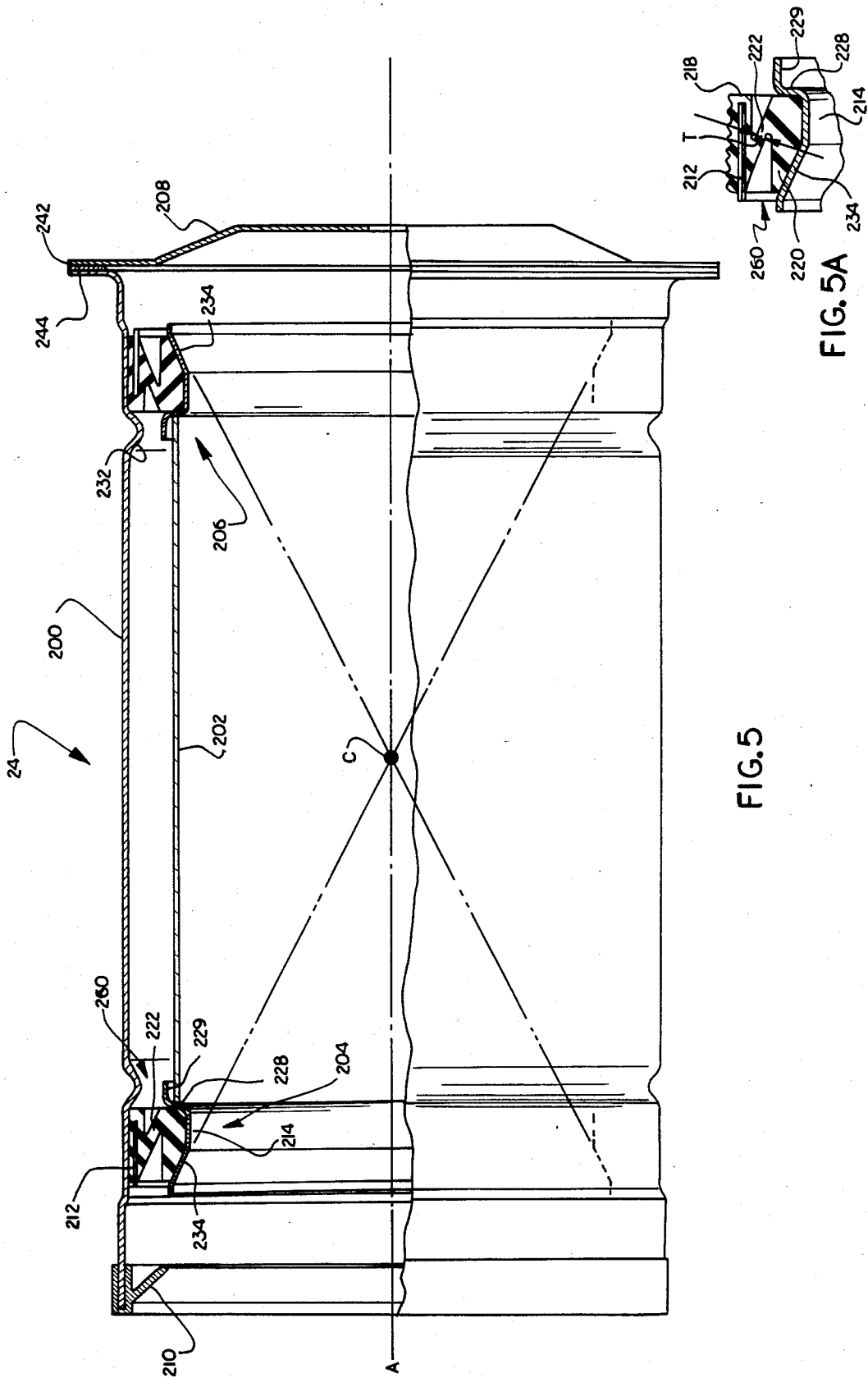

DOPPLER RADAR VELOCITY MEASUREMENT HORN

BACKGROUND AND FIELD OF THE INVENTION

The present invention relates to doppler radar apparatus for use in measuring the velocity of vehicles such as a farm tractors and the like.

Various operations performed by agricultural equipment must be controlled as a function of the speed at which the equipment is travelling. For example, contemporary agriculture often requires the distribution of liquid or solid herbicides, pesticides, fertilizers, etc. over the area in which crops are or will be planted. If the quantity of liquid or solid applied per unit area is inexact or incorrect, it can decrease the effectiveness of the material being distributed or increase the cost of distribution. A similar distribution control problem arises during planting, in which the spacing between adjacent seeds also affects the cost of the planting and the maximum crop yield. The accuracy of the distribution of seed and other materials per unit area depends upon the accuracy with which (a) the materials are dispensed and (b) the speed of the vehicle can be determined.

The speed of farm tractors and other off-highway equipment is not easily determined with accuracy. The conventional method of measuring the speed of a vehicle, i.e., by measuring the rate of revolution of the wheels which drive the vehicle, is not accurate when applied to farm tractors, for example, due to the high rate of slip of the driven wheels relative to the ground. Measuring the speed of a tractor by measuring the rate of rotation of the tractor's undriven wheels is also inaccurate because the wheels tend to skid during turning and to lift off the ground under certain circumstances.

It has been recognized that the speed of land vehicles may be measured using doppler radar equipment. Doppler radar operates by broadcasting a radio frequency (RF) electromagnetic wave in a thin beam, and measuring the frequency of the wave reflected from the ground relative to the frequency of the broadcast wave. The difference between the two frequencies is directly proportional to the speed of the vehicle.

The doppler radar apparatus should ideally produce a narrow radar beam with substantially no side lobes, so that the beam can be pointed at a defined area of the ground and will not strike and be reflected from adjacent structures, such as vehicle tires. The radiation pattern of the electromagnetic wave generated by the doppler radar apparatus is dependent upon the characteristics of the antenna used with the apparatus. One type of antenna known to have low levels of side lobes is the so-called "dual mode" horn antenna. Dual mode horn antennas are described in the P. D. Potter article entitled "A New Horn Antenna With Suppressed Side Lobe and Equal Beam Widths", the *microwave journal,* pages 71-78 (June, 1963).

Dual mode horn antennas are designed so that the electromagnetic wave propagates through the horn in two modes. The radiation pattern of the antenna is a composite of the patterns produced by the two modes, and includes substantially no side lobes since the side lobes produced by one mode cancel the side lobes produced by the other mode. The composite pattern thus produced has essentially no radiation energy outside of the main or axial lobe. In the past, it has been presumed that in order to produce the proper boundary conditions for the two modes at the mouth of a dual mode horn, the horn had to be designed to have a rather small flare angle, on the order of 12.5°. A small flare angle results in a relatively long horn, however, since the length of a horn is established by its flare angle. Specifically, the diameter of the horn mouth is essentially determined in accordance with the desired gain and beam width of the resulting RF pattern. Given the preferred horn diameter of four to five inches for land vehicle applications using frequencies in the 24 GHz range, a horn must be nearly two feet long in order to have a 12.5° flare angle. A two foot long horn is simply too large to be of practical use on farm tractors and other off-road vehicles.

Even if a horn having the required radiation pattern and physical size requirements could be designed, problems would still be encountered in making the doppler radar system mechanically durable and reliable. The horn must be capable of withstanding the severe mechanical shocks to which a farm tractor or other off-road vehicle will be subjected. Some materials normally used in electromagnetic antennas or their components are not entirely suitable for use in off-road vehicles. The dielectric lenses sometimes used on horn antennas, for example, are generally constructed of pure polymeric materials. Such materials are brittle and somewhat weak, and would therefore be subject to breakage if used on a farm tractor or other off-road vehicle. Other dielectrics can be substituted for the polyethylenes normally used in RF lens structures. Any dielectric material that is used, however, must generally conform to certain standards of homogeniety, since inhomogeneousness of the material may result in dispersion or polarization of the RF wave which is being focused by the lens.

Furthermore, if more than one type of metal is used in the doppler apparatus, differences in the responses of the metals to temperature changes can cause stressing or loosening of internal components of the apparatus. For example, the horn and its related microwave components are generally formed of aluminum, since aluminum is easily cast into the complex shapes in which the components are to be formed. The exterior housing and horn mounting components, on the other hand, should preferably be formed of steel since steel is inexpensive and rugged. When an aluminum horn assembly is mounted within a steel structure, however, differences between the temperature coefficients of the two materials can cause stressing and loosening of joints between components, thereby degrading the durability or life of the apparatus.

Another problem of the typical doppler radar system relates to the observed tendency of doppler radar systems to indicate that a vehicle is moving when it is in fact stopped. One method of avoiding such erroneous indications would be to disable the speed indication provided by the doppler radar whenever the vehicle tires remained stationary for more than a selected time period. Such a solution to the problem complicates the electrical interconnection between the doppler radar system with the rest of the vehicle, however, and is undesirable for that reason. In one doppler radar system for a vehicle, the problem is solved by disabling the speed indication whenever it is below a selected threshold speed. It would be desirable if a doppler radar system could be devised which simply did not provide the erroneous velocity indication in the first place.

SUMMARY OF THE INVENTION

The present invention relates to doppler radar velocity measurement apparatus that has electrical and mechanical characteristics which render it suitable for use on off-road vehicles such as farm tractors and the like. The apparatus of the invention is a small, compact package that generates a narrow, well-defined beam of microwave energy having substantially no side lobes. In addition, the apparatus provides substantially zero output when the vehicle is halted, and is both durable and temperature resistant.

The doppler radar apparatus in accordance with the present invention uses a dual mode horn antenna having a flare angle which is substantially in excess of the 12.5° normally used. The horn used in the described embodiment has a flare angle of 38.84°. Despite the wide flare angle, the horn does not suffer from the mode phasing problems which had been anticipated. Moreover, because selection of the large flare angle, the length of the horn necessary to arrive at the desired horn mouth diameter is substantially reduced. Thus, the dual mode horn is short enough for use on off-road vehicles.

The horn employs a dielectric lens positioned over the horn so as to assist in focusing of the beam. The lens is formed of a glass filled polymer. Surprisingly, the glass filling does not interfere with the electrical characteristics of the lens. The glass filled polymer provides a lens of substantially greater strength than conventional lenses formed, for example, of pure polyester material.

The doppler radar apparatus of the invention is designed such that the fit between the microwave horn assembly and the housing assembly does not loosen with temperature variations, even though the two assemblies are constructed of different materials. The housing assembly has interior surfaces which abut matching exterior surfaces of the microwave horn assembly. The planes of the abutting surfaces are selected to be parallel to the direction of expansion or contraction of the assemblies due to temperature variations. Unequal expansion or contraction of the different structural materials of which the housing and horn assemblies are fabricated thus cause sliding of the abutting surfaces relative to one another rather than loosening of the fit between the assemblies.

It has been found that the tendency of a doppler velocity apparatus to provide a nonzero velocity indication when the vehicle on which it is mounted is stationary is caused largely by vibrations imparted to the doppler velocity apparatus by the idling vehicle engine. To solve the problem, the apparatus of the invention includes vibration isolators whose spring rate and damping characteristics are selected in accordance with the characteristics of a high-pass filter used to filter the doppler signal provided by the apparatus. More particularly, the spring rate and damping characteristics of the vibration isolator are selected such that low level vibrations of frequencies which would produce doppler frequencies greater than the cut-off frequency of the high-pass filter are not transmitted to the microwave horn assembly.

BRIEF DESCRIPTION OF THE DRAWINGS

The foregoing and other objects and advantages of the present invention will become more readily apparent from the following detailed description, as taken in conjunction with the accompanying drawings, wherein:

FIG. 5 is a quarter section side view of the housing assembly of the FIG. 2 apparatus; and FIG. 5A is an enlarged sectional view of the vibration isolators of the housing assembly.

DETAILED DESCRIPTION

A doppler radar unit is largely self-contained and must be mounted on a vehicle such that the beam of microwave energy which it generates will strike and be reflected from the ground beneath the vehicle. The doppler radar unit can be mounted either at the front or back of some vehicles, since in both places there is generally an unrestricted view of the ground over which the vehicle is passing. On a farm tractor, however, front and rear mounted implements such as stackers and plows may interfere with the operation of the doppler radar. As a result, the doppler radar unit must be mounted on the side of a tractor. The doppler radar unit should preferably be mounted near the center of the tractor, and can be pointed either forward or rearward.

Figure 1:
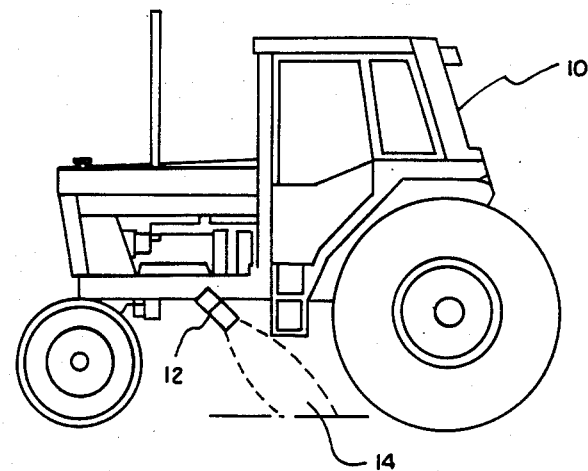
FIG. 1 is a side elevation view of a farm tractor, indicating the location at which doppler radar apparatus could be mounted.

FIG. 1 shows a farm tractor 10 with a doppler radar unit 12 mounted at a representative location on the side of the vehicle. The beam 14 generated by the unit illuminates the ground between the rear tires. It is therefore important that the beam be confined in width. If the beam has excessive spillover in the area of the wheels, microwave energy will be reflected from the wheels which will substantially interfere with the operation of the unit. To prevent this from occurring, the unit must produce a beam having a narrow width and virtually no side lobes. If the area illuminated by the radar unit is too small, however, irregularities in the ground surface will produce marked deviations in the velocity measured by the system. By broadening out the beam to cover, for example, 5°-8°, sufficient ground area is illuminated that a spatial averaging effect takes place, whereby the mean frequency of the returned microwave signal is accurately representative of the actual speed of the vehicle.

Figure 2:
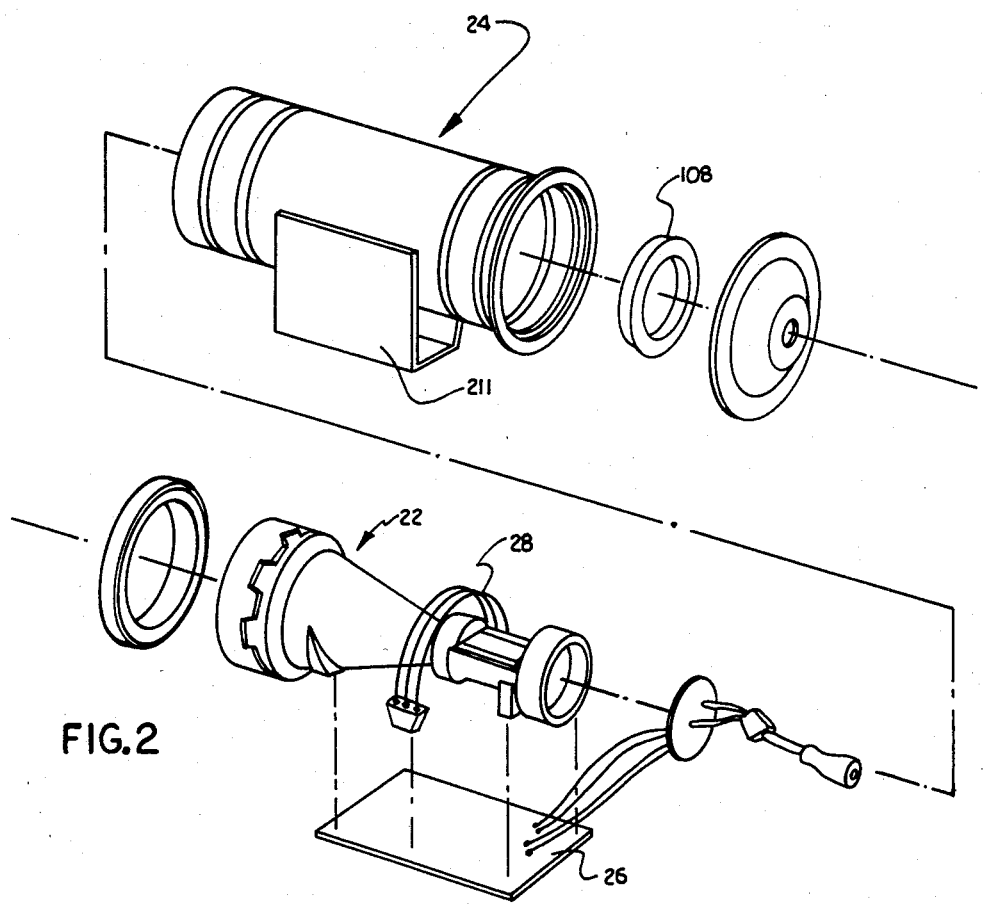
FIG. 2 is an exploded view of doppler radar apparatus in accordance with the teachings of the present invention.

A doppler radar velocity measurement system in accordance with the teachings of the present invention is illustrated in partially disassembled form in FIG. 2. The system includes two major assemblies—a microwave horn assembly 22 and a housing assembly 24. In addition, a printed circuit board 26 is connected to the microwave horn assembly 22 by an electrical cable 28.

Figure 3:
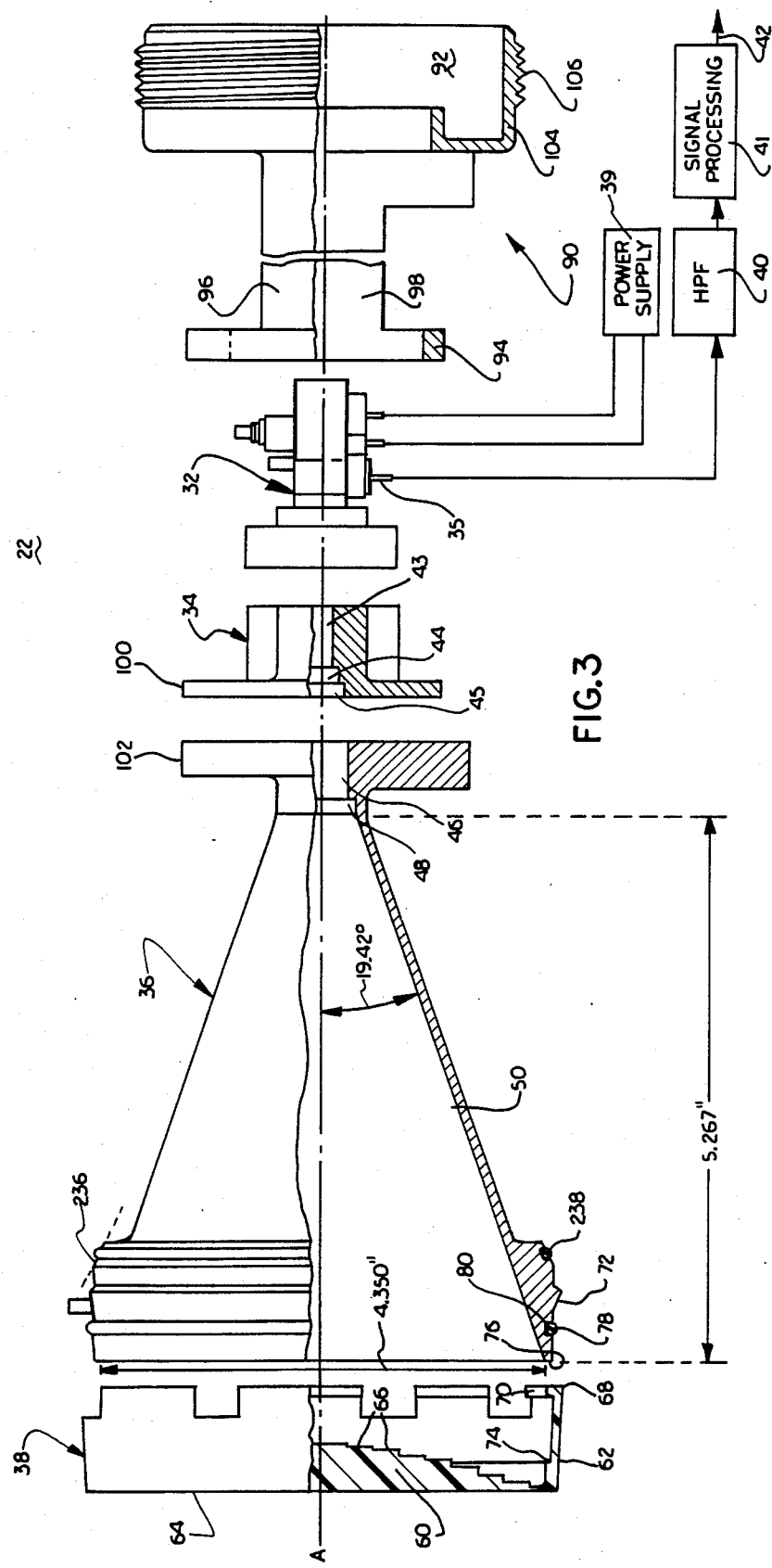
FIG. 3 is an exploded quarter section side view of the microwave horn assembly of the FIG. 2 apparatus.

A quarter sectional, side view of most of the major parts of the microwave horn assembly 22 is shown in FIG. 3. For simplicity of understanding, the elements are shown disassembled in FIG. 3. The microwave horn assembly 22 includes a microwave transceiver 32, a waveguide transformer 34, a mode generator and horn antenna 36, and a horn cover 38 which incorporates a dielectric lens. Certain related electronic circuits 39, 40, and 41, are contained on the printed circuit board 26

(FIG. 2) which is mounted on the microwave horn assembly.

The microwave transceiver 32 is a conventional component and therefore will not be described in detail. The transceiver 32 is not sectioned in FIG. 3. Generally, the transceiver includes a conventional GUNN oscillator for generating a linearly polarized microwave signal having a frequency of approximately 24.125 GHz. The oscillator is powered by a power supply 39, which is in turn connected to the vehicle battery. The transceiver 32 has a rectangular waveguide (not shown) formed in it for guiding the generated microwave signal to the waveguide transformer 34. The microwave signal propagates through the transformer 34, the horn 36, and the cover 38 into free space. The horn assembly 22 will preferably be mounted such that the polarization vector of the transmitted signal is vertically oriented. The returned signal (reflected from the ground) is gathered by the horn 36, and travels through the transformer 34 back into the transceiver 32. The transceiver mixes the returned signal with the original signal, thereby forming a doppler signal the frequency of which is equal to the difference between the frequency of the original signal and the frequency of the returned signal. The doppler signal is coupled to an external terminal 35 on the transceiver.

The doppler signal output terminal 35 of the transceiver 32 is connected to a high pass filter 40. The high pass filter eliminates all frequencies below a breakpoint of around 50 Hz. As will be described further hereinafter, the filter 40 has electrical characteristics which complement the mechanical characteristics of two mechanical vibration isolators incorporated in the housing assembly 24. The filter and vibration isolators cooperate to eliminate erroneous velocity readings when the vehicle is stopped. The output of the high pass filter is connected to the input of a signal processing circuit 41. The circuit 41 processes the high-pass filtered doppler signal and provides a processed signal at an output terminal 42, which represents the output of the system. The signal provided on output terminal 42 has a frequency which is directly proportional to the velocity of the vehicle on which the doppler radar apparatus is mounted.

The waveguide transformer 34 is included in the horn assembly to provide a smooth electromagnetic transition between the rectangular waveguide of the transceiver 32 and a circular waveguide section 46 which is located at the throat of the horn antenna 36. The transformer section 34 includes a waveguide having three distinct rectangular cross section portions 43, 44 and 45. The widths of the three portions 43, 44 and 45 (i.e., the dimension measured in a direction normal to the plane of the paper, as viewed in FIG. 3) are all equal. The heights of the three sections are, however, different. The height of the first portion 43 is less than its width, but both the height and width match the corresponding dimensions of the waveguide section of the transceiver 32. Thus, when the transceiver 32 is bolted to the waveguide transformer 34 (by bolts not shown), the two waveguides are aligned with one another and provide a single waveguide of uniform cross sectional shape. The height of the third transformer portion 45 matches its width so that the portion has a square cross section. The height of the intermediate portion 44 is intermediate the heights of the other two portions 43 and 45.

The horn antenna 36 includes a circular waveguide 46 which is coaxial with the axis of symmetry A of the three transformer portions 43, 44, and 45 when the horn and the transformer are bolted together. The diameter of the circular waveguide 46 is slightly greater than the height of the square cross sectional portion 45 of transformer 34, and is such that the 24.125 GHz RF wave predominantly propagates through the waveguide 46 in the circular $TE_{11}$ mode. A second mode is, however, excited by a step transition 48 in the diameter of the cylindrical waveguide 46. (The excitation of a second mode in this manner is known, and is described in the previously mentioned Potter article.) The RF signal passing through the flared section 50 of the horn antenna 36 therefore includes two modes, the predominant $TE_{11}$ mode and the higher order $TM_{11}$ mode. Both modes propagate through the flared section 50 of the horn, and pass from there into free space. The horn 36 is a pyramidal conical horn. The axis A coincides with the axis of cylindrical symmetry of the horn 50.

The horn antenna 36 produces a radiation pattern having a center (known in the art as the boresight of the antenna) which is coincident with the axis of symmetry A of the horn 36. The radiation pattern of the horn antenna 36 is a composite of the radiation patterns produced by the $TE_{11}$ and $TM_{11}$ waves. The pattern produced by the $TE_{11}$ wave has a pronounced axial peak, and off-axis side lobes of various amplitudes. The $TM_{11}$ mode, on the other hand, produces a pattern which lacks an axial peak. The $TM_{11}$ pattern includes off-axis side lobes which effectively cancel the side lobes of the pattern produced by the $TE_{11}$ mode. The resulting composite radiation pattern therefore consists essentially of the pronounced central peak alone, with very little energy dispersed in the side lobes.

The gain of the horn antenna 36 and the width of the main lobe of its radiation pattern are both related to the mouth diameter of the horn 36. For use of the doppler unit 12 on a farm tractor, a preferred pattern of ground illumination was produced by a beam width on the order of 8°. The beam width, coupled with the frequency being used (24.125 GHz), dictated that the horn mouth should be on the order of four to five inches. It has been conventional wisdom that, in order for the $TE_{11}$ and $TM_{11}$ waves to be phased properly at the horn mouth, the slope of the flared or conical section of the horn should be on the order of 6.25° with respect to axis A, giving a flare angle of 12.5°. For a 12.5° flared horn to have a four inch diameter mouth, however, the flared section must be about two feet long. A two foot horn is too long to be mounted conveniently on the side of a tractor or most other vehicles.

It has now been found that the flare angle on the conical section of the horn antenna may be increased by as much as two or three times without adversely affecting the phasing of the $TE_{11}$ and $TM_{11}$ waves. In the specific example being described, the flare angle of the conical section 50 is about 39°. This flare angle, coupled with a mouth diameter of approximately 4.35 inches, results in a horn length of only about 5.27 inches.

A horn antenna with a large flare angle does tend to disperse the beam of microwave energy passing through it. The dispersive effects of the increased flare angle are mitigated by including a dielectric lens element in the horn cover 38. The horn cover 38 shown in FIG. 3 includes a dielectric lens 60 and a cylindrical rim 62. The lens 60 is circularly symmetrical about the axis A and has a planar outer surface 64. The inner surface of the lens 60 is formed by plural concentric annular steps 66, the axial thickness of the lens being constant across the width of each step. The contour of the inner surface of the lens, which is established by the differences in the thickness of the lens at the various steps 66, is convex and is selected so that the focal point of the lens substantially coincides with the phase center of the antenna. The antenna phase center is located within the throat of the horn.

The cylindrical rim 62 of the horn 38 is formed in one piece with the lens 60, and joins the outer perimeter of the lens. The rim 62 has a short tubular portion with plural axially projecting tabs 68 circumferentially spaced around the end of the rim 62 opposite the lens 60. The tabs 68 are formed with radially directed beads 70 that engage an annular ridge 72 cast into the outer perimeter of the horn 36. When the horn cover 38 is pushed over the end of the horn 36, the tabs 68 flex outward over the ridge 72, and then snap back in place so that the beads engage the annular ridge and hold the horn cover 38 firmly in place over the end of the horn antenna 36. A tight, environmentally secure seal between the horn cover 38 and the horn antenna 36 is assured through use of an O-ring 78. The O-ring is carried in an annular groove 80 in the exterior surface of the horn antenna 36 between the ridge 72 and the outer edge 76 of the horn.

When the horn cover is in place, the outer edge 76 of the horn 36 abuts an annular lip 74 which projects radially inward from the cylindrical rim 62. The portion of the rim between the annular lip 74 and the point at which the rim joins the lens 60 functions as a axial spacer, holding the lens 60 at a predetermined axial distance from the horn antenna 36. The axial spacing of the lens 60 established by the annular lip 74 is selected to minimize the voltage standing wave ratio (VSWR) within the horn antenna 36 caused by reflections from the dielectric lens 60.

The lens 60 must endure significant mechanical stresses during the lifetime of the doppler radar apparatus, and hence must be constructed of a strong and durable material. Normally such lenses are formed of a homogeneous polymeric material, such as polyethylene. Normal homogeneous polymeric materials have relatively low durability and shock resistance, however. It is known that glass filled polymers have greater strength and durability than pure polymers. Nonetheless, in the past it has been presumed that glass filled polymers could not be employed to focus frequencies in the gigahertz range since the glass particles would cause the polymer to appear inhomogeneous to those frequencies, resulting in dispersion and possibly polarization of the RF beam. Upon experimentation, however, it has been found that a dielectric lens formed of a glass filled polymeric material does not cause the expected RF dispersion and/or polarization. It is therefore both possible and desirable to form the dielectric lens of a glass filled polymeric material. In the specific embodiment being described, the lens is formed by injection molding of a 40% glass filled polyester sold by RTP Company of Winona, MN, under the trade name "Fiberite No. 1007". This material is not only strong and durable, but also (unlike pure polyester) has a coefficient of thermal expansion which closely matches the coefficient of thermal expansion of the aluminum horn. The horn 36 and horn cover 38 thus expand and contract essentially as one unit in response to local temperature changes.

Figure 4:
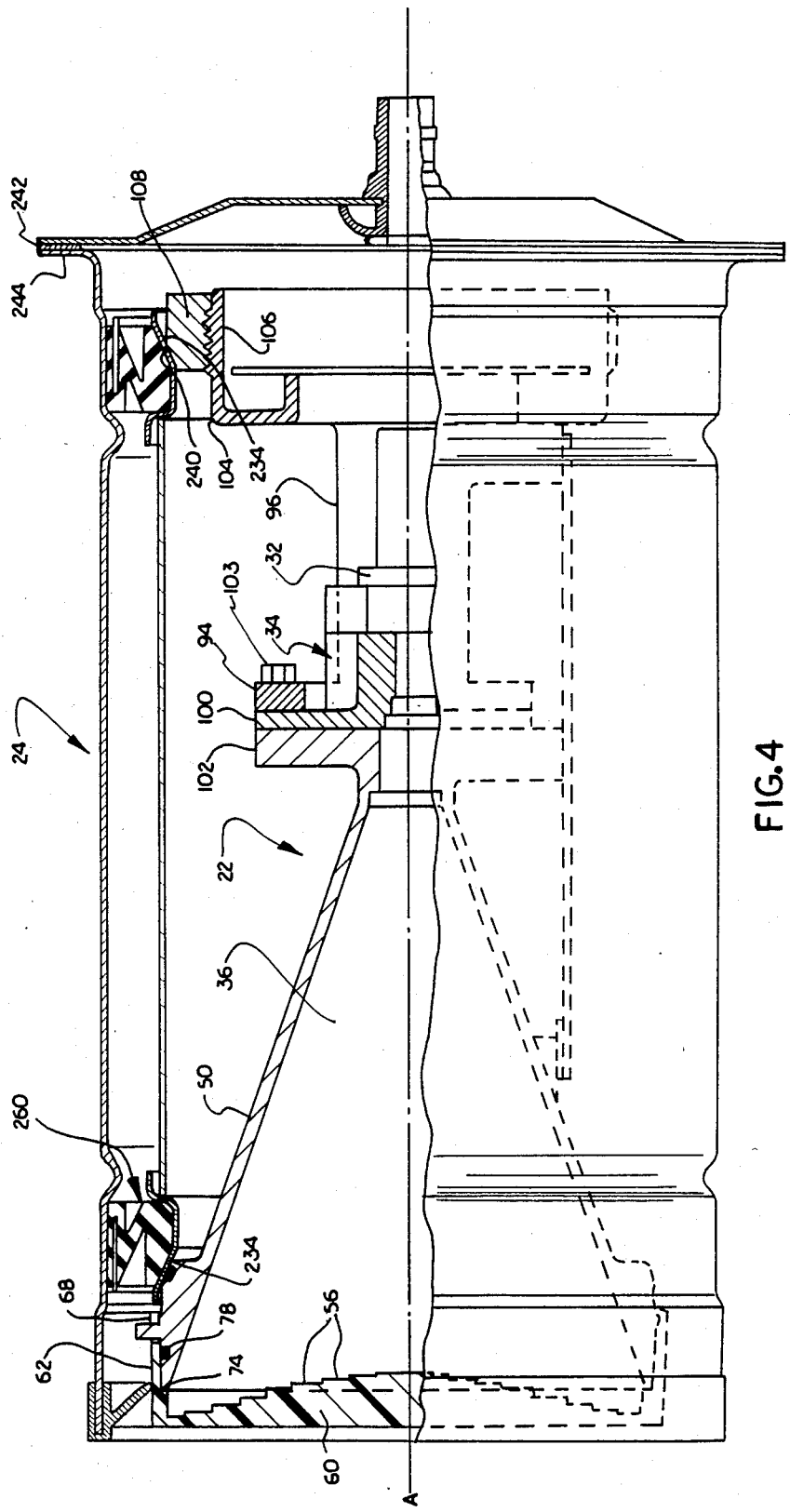
FIG. 4 is a quarter section side view of the assembled unit.

In addition to the elements described above, the microwave horn assembly 22 includes a mounting adapter 90 and a locking ring 108 (shown in FIGS. 2 and 4). The mounting adapter 90 is a one-piece, cast aluminium member that includes two axially spaced annular rings 92 and 94 joined by spacer portions 96 and 98. The spacer portions 96 and 98 extend axially between the perimeters of the two annular rings 92 and 94 at diametrically opposed circumferential positions. The central opening in annular portion 94 has a large enough diameter that the adapter 90 can receive both the microwave transceiver 32 and most of the waveguide transformer 34. At its end adjacent the horn antenna 36, the waveguide transformer has a mounting flange 100 with an outer diameter approximately the same as the outer diameter of annular portion 94 of adapter 90. The annular portion 94 of adapter 90 thus abuts the flange 100, which in turn abuts a similar flange 102 carried by the horn 36. The three elements, mounting adapter 90, waveguide transformer 34 (with transceiver assembly 32 attached), and horn antenna 36 are firmly attached to one another by lug bolts. One of the lug bolts 103 is shown in FIG. 4. The lug bolts project through axial holes in the annular portion 94 of adapter 90 and the mounting flange 100 and are screwing into threaded holes (not shown) in the mounting flange 102.

The second annular portion 92 of the mounting adapter 90 includes a cylindrical outer wall 104 having threads 106 formed on its outer surface for receiving the locking ring 108 (see FIGS. 2 and 4). The microwave horn assembly 22 is held in place within the housing assembly 24 by the locking ring 108. Moreover, as will be brought out hereinafter, the locking ring 108 also holds the elements of the housing assembly 24 together.

FIG. 4 shows how the microwave horn assembly 22 is mounted within the housing assembly 24. For simplicity of description, the housing assembly 24 is illustrated separately in FIG. 5. As is shown in FIG. 5, the housing assembly 24 includes a generally cylindrical outer housing 200, a generally cylindrical inner housing 202, two identical toroidal vibration isolators 204 and 206, an end cover 208, a splash shield 210 and a bracket 211 (shown in FIG. 2) for attaching the housing to a tractor. The microwave horn assembly 22 seats against interior annular surfaces of the two vibration isolators 204 and 206, and is isolated from vibrations applied to the outer housing 200 due to the axial and radial resiliency of the vibration isolators. The vibration isolators 204 and 206 are identical, but face opposite axial directions. Each includes inner and outer steel rings 212 and 214 and a resilient intermediary material 260. The intermediary material 260 is cast in place or injection molded between the two rings 212 and 214. In the embodiment of the invention being described, the intermediary material 260 is a silicon elastomer (type 3FC510B37C20E016G-11EA14, according to classification conventions established by publication D2000 of the American Society of Testing and Materials). The silicon has a hardness of about 30–40 durometer.

The isolation characteristics of the vibration isolators 204 and 206 are established, in part, by the shape of the resilient material 260 sandwiched between the annular rings 212 and 214. As can be seen more clearly in FIG. 5A, the resilient material 260 includes an outer annular portion 218 in which the outer ring 212 is embedded, and an inner annular portion 220 bonded onto the radially outer surface of the inner ring 214. The two annular portions 218 and 220 are joined by a thin, conical portion 222. The thickness and shape of the conical portion 222 of the resilient material 260 cause vibrational forces transmitted from the outer housing 200 to be absorbed initially and primarily by deflection of the portion 222. Because the portion 222 is disposed at an acute angle to the axis of symmetry A of the unit 12, the portion 222 is effective to absorb both radial and axial vibrations and gives each isolator 204 and 206 essentially the same spring rate in respons to both radial and axial vibrations. If a shock load is applied to an isolator or if the vibrational forces become so great that the conical portion 222 collapses and permits the annular portions 218 and 220 to abut each other, the spring rate of the isolator will increase substantially due to the compression loading of the resilient material.

The initial spring rate and damping characteristics of the vibration isolators 204 and 206 are established by the thickness T of the conical portion 222 and by the material of which it is formed. In accordance with one aspect of the present invention, the spring rate and damping characteristics of the vibration isolator are selected in accordance with the cutoff frequency of the high pass filter 40 which filters the output of the microwave transceiver 32. As has been described previously, the cutoff frequency of the high pass filter (FIG. 3) is about 50 Hz. Consequently, any vibrational motion which produces a doppler frequency below the frequency of 50 Hz will not be perceptible to the circuitry which responds to the output of the low pass filter. Thus, it is desirable that the material and thickness T of the conical portion 222 of the resilient material 260 be selected so that the microwave horn assembly is isolated from low level vibrations frequencies which would produce doppler frequencies in excess of 50 Hz.

The preferred thickness T was determined largely empirically. A particular thickness T was selected and then the resonant frequency of the system was determined by shaking the outer housing at different frequencies and measuring the accelerations experienced by the suspended components (i.e., the horn assembly 22, inner housing 202, and inner portions of the vibration isolators). The resonant frequency (f) of the system is related to the mass (m) of the suspended components (which weigh about 3.5 lbs in the example being described) and the spring rate (k) of the vibration isolators by the equation $f=(k/m)^{\frac{1}{2}}/(2)$. It was determined empirically that the resonant frequency (f) had to be below 40 cycles per second in order to isolate the horn assembly from vibrations which would produce doppler signal frequencies above the cutoff frequency of the high pass filter 40 (FIG. 3).

With the particular silicon elastomer used in the embodiment of the invention being described, it was found that the thickness T had to be approximately 0.030 inches in order for the initial spring rate of the vibration isolator to provide the desired isolation. A thickness of 0.030 inches, however, was not sufficient in itself to lower the resonant frequency of the vibration isolators below the point at which doppler frequencies in excess of 50 Hz were produced. The spring rate and thus the resonant frequency of the vibration isolators was reduced still further by slightly buckling the conical portion of the resilient material 260. The conical section 222 was buckled by axially displacing the inner annular ring 214 of each isolator 204 and 206 as compared to the positions of the rings with the resilient material 260 unstressed. The relative displacement of the two rings is achieved by appropriate selection of the length of the interior housing 202, which establishes the axial spacing between the inner axial rings 214 of the two vibration isolators 204 and 206.

More specifically, the interior housing 202 extends between a radially directed lip 228 on the interior ring 214 of vibration isolator 204 and the corresponding lip of the interior ring of vibration isolator 206. The diameter of the inner housing matches the mean diameter of the lip 228, whereby the tube and each ring 214 abut throughout their circumferences. The inner housing 202 is held in the proper transverse location relative to the lips 228 by rims 229. The rims 229 extend axially inward toward the center of the assembly 24 and have diameters somewhat greater than the diameter of the spacer tube. The ends of inner housing 202 are received within the rims, and are thus held in coaxial alignment with the lips 228.

The axial locations of the exterior rings 212 of the vibration isolators 204 and 206 are established by two radially inwardly projecting annular ridges 230 and 232 in the outer housing 200 of the housing assembly 24. Each of the vibration isolators 204 and 206 is inserted axially into a corresponding end of the outer housing 200 until it abuts the adjacent annular ridge 230 or 232. The resilient material between the exterior ring 212 of each vibration isolator and the housing 200 is compressed upon insertion of the isolator into the housing, thus producing a tight friction fit. The friction fit prevents the vibration isolators from moving away from the corresponding ridges 230 and 232.

The spacing between the two annular ridges 230 and 232 is less than the length of the inner housing 202. Upon assembly of the isolators 204 and 206 with the inner and outer housings 202 and 200, therefore, the interior ring 214 of each vibration isolator is axially displaced from its normal position relative to the corresponding outer ring 212. This buckles the conical portion 222 of the resilient material 260, as described previously, and reduces the spring rate of the conical portion 222. The suspension then has a first resonant frequency of about 30 cycles per sec, which is low enough that vibrations which would produce doppler frequencies in excess of 50 Hz are isolated from the microwave assembly.

As can best be seen in FIG. 4, the microwave horn assembly 22 is carried within the housing assembly 24 by two frustoconical surfaces 234 on the interior annular rings 214 of the vibration isolators 204 and 206. Each of the frustoconical surfaces 234 is symmetrical about the axis A and is flared radially outwardly in an axial direction away from the center of the housing assembly 24. A corresponding frustoconical surface of the microwave horn assembly 22 abuts each frustoconical surface of an annular ring 214. One of the frustoconical surfaces of the microwave horn assembly 22 is frustoconical surface 236 (best seen in FIG. 3) on the horn 36. The frustoconical surface 236 includes a circumferential groove that receives an O-ring 238 to provide a secure environmental seal between the vibration isolator and the horn assembly. The other frustoconical surface of the microwave horn assembly 22 is a frustoconical surface 240 (FIG. 4) on the locking ring 108. There is no O-ring on the locking ring 108 because the rear end of the assembly is protected by a gasket 242 between the housing cover 208 and the outer housing 200.

The microwave horn assembly is locked into position against the vibration isolators 204 and 206 by the locking ring 108. The locking ring 108 is screwed onto the mounting adapter 90 after the microwave horn assembly has been inserted into the housing assembly 24 through its lefthand end (as viewed in FIG. 4). The single locking ring 108 thus holds the microwave horn assembly firmly within the housing assembly 24. Since the locking ring also applies axial pressure against the two inner rings 214 of the vibration isolators 204 and 206, it also holds the vibration isolators 204 and 206 against the ends of the inner housing 202.

The major structural elements of the microwave horn assembly 22, including the transceiver assembly 32, waveguide transformer 34, horn 36, and mounting adapter 90 are all cast aluminum. The elements of the housing 24 shown in FIG. 5, on the other hand, including the inner and outer tubes 200 and 202 and the outer and inner rings 212 and 214 of the vibration isolators 204 and 206, are all fabricated of steel. Since steel and aluminum have different coefficients of thermal expansion, changes in temperature would normally tend to cause loosening of the fit between the aluminum and steel elements. The possibility of such loosening is avoided in the apparatus 12 by carefully selecting the angles of the abutting frustoconical surfaces 234, 236 and 240 relative to the axis A.

More specifically, the abutting surfaces of vibration isolators 204 and 206 and microwave horn assembly 22 lie on two imaginary conical surfaces having a common apex "C" located on the axis A midway between the two vibration isolators 204 and 206. Point C represents the center of expansion of both the aluminum horn assembly and the steel housing assembly. Thus, in response to thermal expansion or contraction of the assemblies, any given point on either assembly will move along a line passing through both that point and the central point C. The contact surfaces between the assemblies are aligned at an angle A relative to the axis A such that they can be extended to pass through the point C. The directions of expansion and contraction of the abutting aluminum and steel surfaces are therefore parallel to one another. As a result, the surfaces will slide across one another rather than separating.

To take full advantage of the thermal stability afforded by the arrangement described above, the locking ring 108 should be fabricated of the same material as the horn assembly, i.e., of aluminum. An aluminum locking ring is somewhat difficult to remove once it has been installed, however. It may in some circumstances be desirable to avoid this by fabricating the locking ring of some material other than aluminum, such as brass.

Once the microwave horn assembly has been locked in place within the housing assembly 24 by the locking ring 108, the housing cover 208 is bolted onto a mounting flange 244 formed at one end of the outer housing 200 of the housing assembly 24. The splash shield 210 is glued onto the other end of the outer tube 200.

Apparatus has thus been described for use in a doppler velocity measuring system for use on farm tractors and the like. The apparatus includes a novel dual mode horn, including a flare angle substantially in excess of 12.5°, and a dielectric lens formed of a glass filled polymer. The doppler signal provided by the RF transceiver associated with the dual mode horn is high pass filtered to remove low frequency signals from the signal. The horn is mounted in such a way that mechanical vibrations which would induce doppler signal frequencies in excess of the cut-off frequency of the high pass filter are not transmitted to the horn assembly. Moreover, the aluminum horn assembly and the steel housing assembly are coupled together in such a way that dimensional changes of the materials due to temperature changes will not produce a loosening of the friction fit between the component parts of the system. Furthermore, the entire system is easily assembled, and is largely held together by a single locking ring.

Although the invention has been described with respect to a preferred embodiment, it will be appreciated that various rearrangements and alterations of parts may be made without departing from the spirit and scope of the present invention, as defined in the appended claims. For example, it is possible to eliminate the inner housing 202 altogether. Tightening the locking ring onto the mounting adapter then causes stretching rather than buckling of the vibration isolators. It has been found that vibration isolators in this tension mode have characteristics similar to those of vibration isolators in a buckling mode. The disadvantage of this approach is that the parts cannot be fastened as tightly as when the inner housing is included. Other variations of the described apparatus will be apparent to those skilled in the art.

What is claimed is:

1. Apparatus for use in a doppler radar velocity measurement system, comprising
    means including a rectangular waveguide for generating an RF wave in said rectangular waveguide, said RF wave having a frequency in the range of 24 GHz,
    waveguide transformer means for providing a smooth RF transition between said rectangular waveguide and a circular waveguide,
    a circular pyramidal horn antenna having a flared section with a mouth and a throat, said horn also including a circular waveguide section formed at the throat of said flared section, said circular waveguide being coupled to said waveguide transformer for receiving said RF wave from said waveguide transformer and being dimensioned so that said RF wave can propogate in only the $TE_{11}$ mode, mode generator means disposed at the junction of said circular waveguide and the throat of said flared section for generating a $TM_{11}$ mode RF wave, said flared section guiding both RF wave modes from said mode generator means into free space, wherein said flared section has an interior mouth diameter of about 4.4 inches and a flare angle of about 39° so that the length of said flared section is only about 5.3 inches, and
    a dielectric lens positioned across the mouth of said flared section, said RF lens being spaced axially from the mouth of said horn so as to reduce the standing wave ratio in said horn, and having a focal length corresponding approximately to its axial spacing from the phase center of said horn antenna.

2. Apparatus for use in a doppler radar velocity measurement system, comprising
    a microwave horn assembly for receiving and transmitting an RF electromagnetic wave, said assembly providing an electrical doppler signal having a frequency equal to the difference between the frequencies of said transmitted and received waves,
    electronic filter means responsive to said doppler signal provided by said microwave horn assembly for high pass filtering said signal to provide an output signal that includes only frequencies above a predetermined cutoff frequency, and
    means for resiliently mounting said microwave horn assembly on a vehicle, said resilient mounting means having spring rate and damping characteristics such that said microwave horn assembly is isolated from low level vibrations having frequencies which would produce doppler signals with frequencies greater than the cutoff frequency of the high pass filter means, whereby erroneous doppler signals produced by horn vibrations are effectively eliminated.

3. Apparatus as set forth in claim 2, wherein said resilient mounting means includes (a) at least two annular vibration isolators encircling and firmly engaging said microwave horn assembly at two axially spaced locations along said assembly, and (b) rigid means engaging said vibration isolators for attaching the isolators to said vehicle.

4. Apparatus as set forth in claim 3, wherein said resilient mounting means further includes a spacer tube arranged between and abutting with said vibration isolators, and wherein said horn assembly includes (a) at least two discrete components, each having a radially extending surface adapted to abut a corresponding one of two circumferential surfaces on opposing axial ends of said resilient mounting means and spacer tube arrangement, and (b) means for fastening said first and second parts axially together when assembled with said resilient mounting means and spacer tube arrangement.

5. Apparatus as set forth in claim 4, wherein said fastening means comprises complementary inner and outer circumferential threads on said two discrete components, said threads permitting said components to be screwed axially together.

6. Apparatus as set forth in claim 3, wherein each vibration isolator includes a thin frustoconical annulus of resilient material, first means coupled to the radially inner perimeter of said frustoconical annulus for providing a surface for engaging said horn assembly, and second means coupled to the radially outer perimeter of said frustoconical annulus for providing a surface for engaging said rigid mounting means.

7. Apparatus as set forth in claim 6, wherein said first and second surface providing means comprise first and second rigid rings to which said resilient material is bonded.

8. Apparatus as set forth in claim 7, wherein said frustoconical annuli of resilient material in the two vibration isolators are oriented in opposite directions, and wherein said resilient mounting means further comprises means for axially spacing said two first concentric rings from one another by a first amount and said two second concentric rings from one another by a second amount, said first and second amounts being such that each said frustoconical annulus is slightly buckled.

9. Apparatus as set forth in claim 7, wherein the first and second rigid rings of each of said vibration isolators have radially facing portions which are formed of resilient material and which are disposed at overlapping axial locations such that sudden mechanical shocks causing momentary collapse of said frustoconical annuli are absorbed by the resilient impact of said resilient facing portions of said first and second rings.

10. Apparatus as set forth in claim 9 wherein each said ring is composed of a resilient material but has a rigid ring adjoined thereto to provide dimensional stability.

11. Apparatus for use in a doppler velocity measurement system, comprising
a microwave horn assembly for transmitting and receiving an RF electromagnetic wave and providing a doppler signal having a frequency related to the velocity of the vehicle to which the system is attached, and
a housing assembly for housing said horn assembly, said housing assembly being formed of a structural material having a coefficient of thermal expansion which is different than the coefficient of thermal expansion of the material of which said horn assembly is formed, said housing assembly having interior surfaces which abut matching exterior surfaces of said microwave horn assembly,
wherein the planes of said surfaces are all selected to be parallel to the direction of movement of the material underlying said surfaces due to thermal expansion or contraction, whereby unequal thermal expansion or contraction of said materials of which said assemblies are formed causes said abutting surfaces to move parallel to one another rather than normal to one another.

12. Apparatus as set forth in claim 11 wherein said microwave horn assembly is aluminum and said housing assembly is steel.

13. Apparatus as set forth in claim 11, wherein said microwave horn assembly is generally cylindrical and has two frustoconical surfaces coaxial with said generally cylindrical horn assembly, wherein said surfaces have equal and opposite degrees of obliquity relative to said axis such that, if said surfaces were extended to form cones, the cones would be similar and would have a common apex disposed between them along the axis, and wherein said housing assembly has matching surfaces which abut said surfaces of said horn assembly.

14. Apparatus as set forth in claim 13, wherein each of said frustoconical surfaces is on a different part of said horn assembly, wherein said parts are adapted to be assembled with said housing assembly by being inserted axially through different ends of said housing assembly until said frustoconical surfaces of said parts meet the corresponding surfaces of said housing assembly, and wherein means are included for fastening said two parts together in the assembled position.

15. Apparatus as set forth in claim 14, wherein said fastening means draws said parts together axially, thereby insuring a tight friction fit between said surfaces of said assemblies.

16. Apparatus as set forth in claim 13 wherein said two frustoconical surfaces are on respective first and second parts of said microwave horn assembly, and where one of said parts carries coaxial outer threads and the other of said parts carries matching coaxial inner threads, whereby said horn assembly and housing assembly are assemblable by inserting said first and second parts axially through different ends of said housing assembly and screwing said two parts axially together until a tight friction fit is formed between said matching frustoconical surfaces of said housing assembly and said first and second parts.

17. Apparatus for use in a doppler radar velocity measurement system, comprising:
means for generating a dual mode RF electromagnetic wave and for guiding said wave to a horn;
a conical horn having a small diameter end and a large diameter end and being coupled adjacent its smaller diameter end to said generating means for transmitting said dual mode RF wave into free space, said horn having a flare angle substnatially in excess of 12.5°;
lens means covering the large diameter end of said horn, said lens means having a focal length substantially equal to the distance from the phase center of said horn to said lens;

said generating means including microwave transceiver means for generating said RF wave and for receiving said RF wave back again after reflection from an obstacle, said transceiver means providing a doppler signal having a frequency equal to the frequncey difference between said generated and received RF waves;

high pass filter means for filtering said doppler signal to eliminate all frequencies in said doppler signal below a selected cutoff frequency; and resilient means for mounting said generating means, horn and lens means on a vehicle, said resilient means having characteristics selected such that said generating means is isolated from low level vibrations having frequencies which would produce doppler signal frequencies in excess of the cutoff frequency of said high pass filter means.

18. Apparatus as set forth in claim 17, wherein said flare angle is in excess of 25°.

19. Apparatus as set forth in claim 17, wherein said lens is formed of a glass filled polymer.

20. Apparatus as set forth in claim 17, wherein said lens is formed of 40% glass filled polyester.

21. Apparatus as set forth in claim 17, wherein said generating means provides an RF wave having a frequency in the range of 24 GHz, and wherein said horn has length of about 5.3 inches and an interior diameter at its large diameter end of about 4.4 inches.

22. Apparatus for use in a doppler radar velocity measurement system, comprising:

means for generating a dual mode RF electromagnetic wave and for guiding said wave to a horn;

a conical horn having a small diameter end and a large diameter end and being coupled adjacent its smaller diameter end to said generating means for transmitting said dual mode RF wave into free space, said horn having a flare angle substantially in excess of 12.5°, said horn and generating means are part of a microwave horn assembly;

lens means covering the large diameter end of said horn, said lens means having a focal length substantially equal to the distance from the phase center of said horn to said lens; and a housing for said horn assembly, said housing being fabricated of a material having a coefficient of thermal expansion different from the coefficient of thermal expansion of a material of which said horn assembly is formed, said housing having interior surfaces which abut corresponding exterior surfaces of said horn assembly, said abutting interior and exterior surfaces being aligned at angles to a central longitudinal axis of the horn assembly selected so that expansion and contraction of the materials caused by temperature variation will produce movement of said abutting surfaces parallel to one another rather than normal to one another.

23. Apparatus as set forth in claim 22, wherein said flare angle is in excess of 25°.

24. Apparatus as set forth in claim 22, wherein said lens is formed of a glass filled polymer.

25. Apparatus as set forth in claim 22, wherein said lens is formed of 40% glass filled polyester.

26. Apparatus as set forth in claim 22, wherein said generating means provides an RF wave having a frequency in the range of 24 GHz, and wherein said horn has length of about 5.3 inches and an interior diameter at its large diameter end of about 4.4 inches.

27. Apparatus for use in a doppler radar velocity measurement system, comprising:

means for generating an RF electromagnetic wave having a frequency of at least 24 GHz and for guiding said wave to a horn;

a horn coupled to said generating means for transmitting said RF wave into free space;

a dielectric lens covering the mouth of said horn, said lens being formed of a glass filled polymer material; and said means for generating an RF electromagnetic wave comprises means for generating a wave in the dominant $TE_{11}$ mode and wherein said horn includes means responsive to said $TE_{11}$ mode RF wave for producing a $TM_{11}$ mode RF wave therefrom, whereby the generated RF wave propagates through said horn in both the dominant $TE_{11}$ and the higher order $TM_{11}$ modes.

28. Apparatus for use in a doppler radar velocity measurement system, comprising:

means for generating an RF electromagnetic wave and for guiding said wave to a horn;

a horn coupled to said generating means for transmitting said RF wave into free space;

a dielectric lens covering the mouth of said horn, said lens being formed of a glass filled polymer material;

said generating means comprises microwave transceiver means for generating said RF wave and for receiving said RF wave back again after reflection from an obstacle, said transceiver means providing a doppler signal having a frequency equal to the frequency difference between said generated and received RF waves;

high pass filter means for filtering said doppler signal to eliminate all frequencies therein below a selected cutoff frequency; and resilient means for mounting said generating means, horn and lens means on a vehicle, said resilient means having characteristics selected such that said generating means is isolated from low level vibrations having frequencies which would produce doppler signal frequencies in excess of the cutoff frequency of said high pass filter means.

29. Apparatus for use in a doppler radar velocity meansurement system, comprising:

means for generating an RF electromagnetic wave and for guiding said wave to a horn;

a horn coupled to said generating means for transmitting said RF wave into free space, said horn and said generating means are part of a microwave horn assembly;

a dielectric lens covering the mouth of said horn, said lens being formed of a glass filled polymer material; and a housing for said microwave horn assembly, said housing being fabricated of a material having a coefficient of thermal expansion different from the coefficient of thermal expansion of a material of which said microwave horn assembly is formed, said housing having interior surfaces which abut matching exterior surfaces of said horn assembly, said abutting interior and exterior surfaces being aligned at an angle to a central longitudinal axis of the horn assembly selected so that expansion and contraction of the materials which is caused by temperature variations will produce movement of said abutting surfaces parallel to one another rather than normal to one another.

* * * * *